United States Patent
Ekambaram et al.

(10) Patent No.: US 10,743,370 B2
(45) Date of Patent: Aug. 11, 2020

(54) DETERMINING THE SIGNIFICANCE OF SENSORS

(71) Applicant: International Business Machines Corporation, Armonk, NY (US)

(72) Inventors: Vijay Ekambaram, Chennai (IN); Ashish K. Mathur, Bangalore (IN); Krishnasuri Narayanam, Bangalore (IN); Ramasuri Narayanam, Nagaram (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/407,303

(22) Filed: May 9, 2019

(65) Prior Publication Data

US 2019/0268968 A1 Aug. 29, 2019

Related U.S. Application Data

(63) Continuation of application No. 15/276,913, filed on Sep. 27, 2016, now Pat. No. 10,327,281.

(51) Int. Cl.
*H04W 84/18* (2009.01)
*G06F 11/00* (2006.01)

(52) U.S. Cl.
CPC .......... *H04W 84/18* (2013.01); *G06F 11/00* (2013.01)

(58) Field of Classification Search
CPC .................................. G06F 17/18; G06F 17/15
See application file for complete search history.

(56) References Cited

U.S. PATENT DOCUMENTS

| 6,159,131 | A | 12/2000 | Pfeffer |
| 8,032,334 | B2 | 10/2011 | Bieswanger |
| 10,327,281 | B2 * | 6/2019 | Ekambaram ........ G06F 11/3055 |
| 2003/0110007 | A1 * | 6/2003 | McGee ............... G06F 11/0709 702/179 |
| 2003/0130595 | A1 | 7/2003 | Mault |
| 2006/0241900 | A1 | 10/2006 | Hu |
| 2008/0093838 | A1 | 4/2008 | Tropper |

(Continued)

FOREIGN PATENT DOCUMENTS

WO 2015179499 A1 11/2015

OTHER PUBLICATIONS

Ekambaram et al., "Determining the Significance of Sensors", U.S. Appl. No. 15/276,913, filed Sep. 27, 2016, 25 pages.

(Continued)

*Primary Examiner* — Manuel L Barbee
(74) *Attorney, Agent, or Firm* — Sonny Z. Zhan

(57) ABSTRACT

A computer-implemented method includes identifying one or more sensor identifiers; identifying one or more activity conclusions; and identifying one or more activity derivation rules each associated with at least one of the one or more sensor identifiers and at least one of the one or more activity conclusions. The computer-implemented method further includes determining, for each of the one or more sensor identifiers, an overall predominance value based on at least one of the one or more activity derivation rules, wherein the predominance value is an estimation of the synergic significance of each of the one or more sensor identifiers to the one or more activity derivation rules. A corresponding computer program product and computer system are also disclosed.

5 Claims, 4 Drawing Sheets

(56) References Cited

U.S. PATENT DOCUMENTS

| | | |
|---|---|---|
| 2010/0049541 A1 | 2/2010 | Pollard |
| 2012/0197852 A1 | 8/2012 | Dutta |
| 2015/0221232 A1 | 8/2015 | Ziv |
| 2015/0339346 A1 | 11/2015 | Berchtold |
| 2018/0089147 A1 | 3/2018 | Ekambaram |

OTHER PUBLICATIONS

IBM Appendix P, list of patents and patent applications treated as related, Filed Herewith, 2 pages.

\* cited by examiner

```
1) A + B + C → [I]
OR B + D → [I]

(2) A + D + E → [II]
OR B + C → [II]

(3) A + D → [III]
OR B + C + E → [III]
```

FIG. 3

DETERMINING THE SIGNIFICANCE OF SENSORS

BACKGROUND

The present invention relates generally to Internet of Things (IoT) ecosystems, and more particularly to determining the significance of sensors in those ecosystems.

In IoT ecosystems, determining the significance of sensors is important to policies for proper maintenance of such sensors. Determining the significance of sensors could also be a difficult task given the complexities associated with the relationship between sensors and determined ecosystem states. The developers and users of IoT solutions continue to face challenges with efficient and effective methods of determining the significance of sensors in IoT ecosystems.

SUMMARY

A computer-implemented method includes identifying one or more sensor identifiers; identifying one or more activity conclusions; and identifying one or more activity derivation rules each associated with at least one of the one or more sensor identifiers and at least one of the one or more activity conclusions. The computer-implemented method further includes determining, for each of the one or more sensor identifiers, an overall predominance value based on at least one of the one or more activity derivation rules, wherein the predominance value is an estimation of the synergic significance of each of the one or more sensor identifiers to the one or more activity derivation rules. A corresponding computer program product and computer system are also disclosed.

BRIEF DESCRIPTION OF THE DRAWINGS

FIG. 3 is an operational example of activity derivation rules, in accordance with at least one embodiment of the present invention.

DETAILED DESCRIPTION

Figure 1:
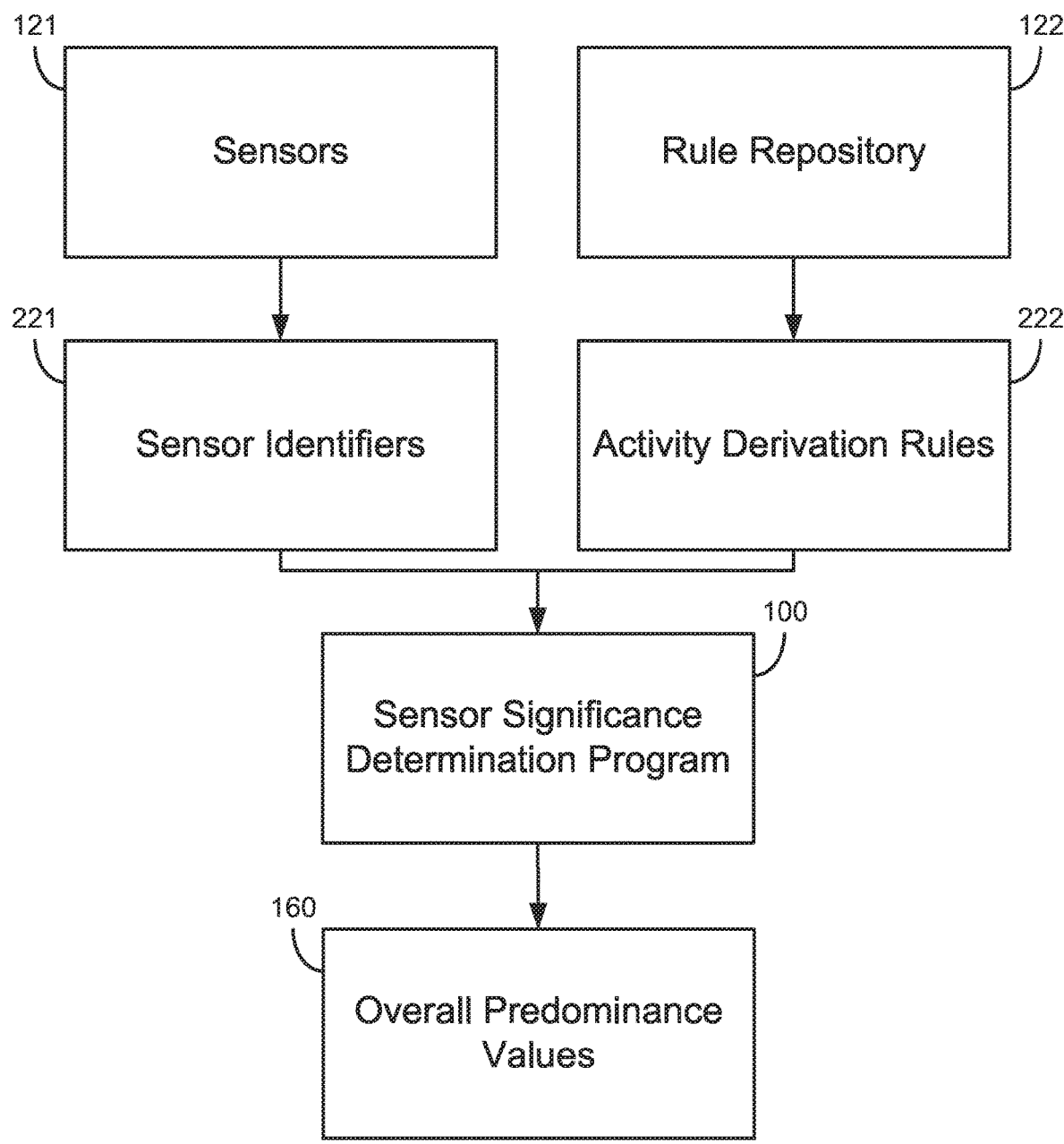
FIG. 1 is a data flow diagram of a parallel execution program, in accordance with at least one embodiment of the present invention.

FIG. 1 is a data-flow diagram of a sensor significance determination program 100, in accordance with at least one embodiment of the present invention. In the embodiment depicted in FIG. 1, the program 100 receives one or more sensor identifiers 221 (i.e., one or more variables whose values is associated with the state and/or operation of at least one sensor in at least one time) from one or more sensors 121. In an exemplary embodiment, a sensor identifier 131 associated with a sensor 121 attached to a lamp can have the values of ON or OFF, indicating that the lamp is determined to be on or off. In the embodiment depicted in FIG. 1, the program 100 receives one or more activity derivation rules 132 from a rule repository 122. In at least some embodiments, an activity derivation rule 222 is a guideline about when the combination of pre-determined values in pre-determined sensor identifiers 131 can be taken to mean a certain activity conclusion (i.e., a conclusion about the state of at least environment and/or a device in at least one time). In some embodiments, an activity derivation rule has the following form:

(sensor_identifier$_a$ with the value $V_{a1}$)+(sensor_identifier$_b$ with the value $V_{b2}$)+(sensor_identifier$_c$ with the value $V_{c3}$)→activity_conclusion$_d$   Rule 1

According to the above Rule 1, the activity_conslusion$_d$ will be determined if: (i) sensor_identifier$_a$ has the value $V_{a1}$; (ii) sensor_identifier$_b$ has the value $V_{b2}$; and (iii) sensor_identifier$_c$ has the value $V_{c3}$. In an exemplary embodiment, an activity conclusion denoting that "someone left the kitchen light on needlessly" will be determined if the sensor identifier denoting the state of the kitchen light has the value associated with the light being on, the sensor identifier denoting the state of the kitchen sink faucet has the value associated with the faucet being off, and the sensor identifying denoting the state of the refrigerator door has the value associated with the refrigerator door being closed.

In the embodiment depicted in FIG. 1, the sensor significance determination program 100 uses the sensor identifiers 131 and the activity derivation rules 132 to determine an overall predominance value 160 associated with each sensor identifier 131. In at least some embodiments, the overall predominance value 160 is an estimation of the synergic significance (see definition below) of each of the one or more sensor identifiers to the one or more activity derivation rules.

Figure 2:
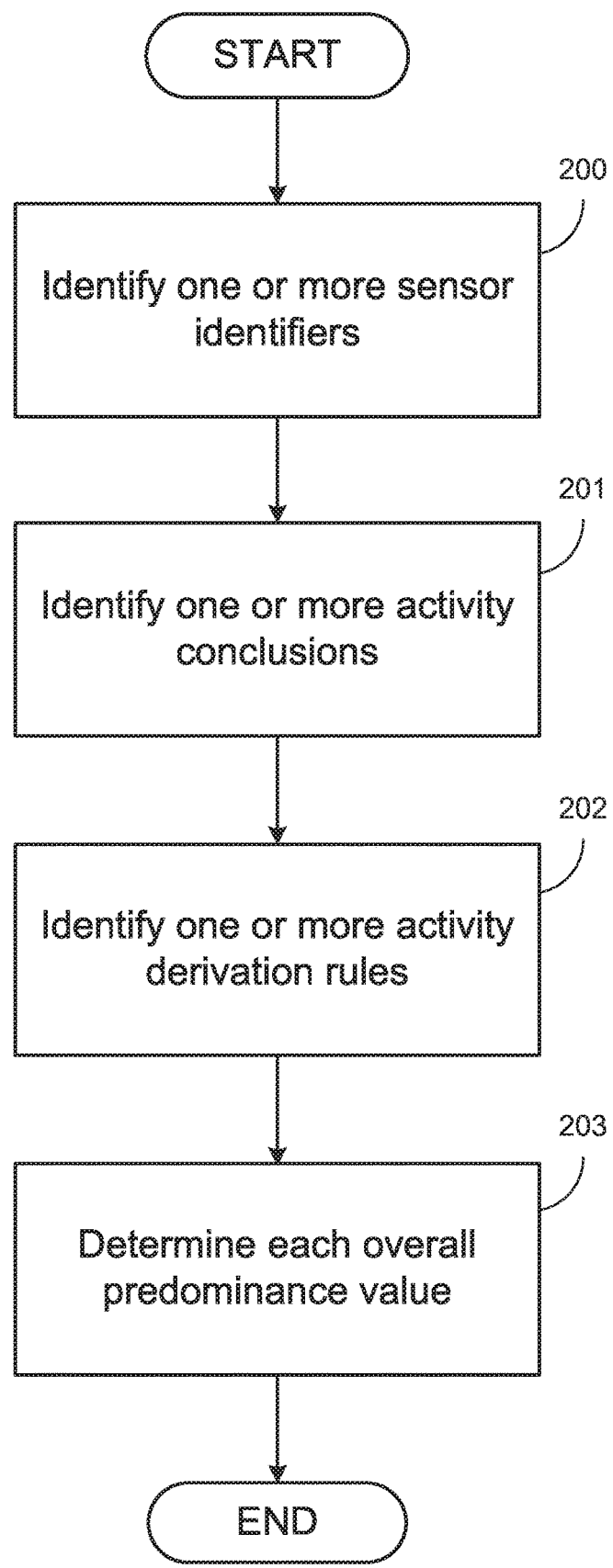
FIG. 2 is a flowchart diagram of a parallel execution program, in accordance with at least one embodiment of the present invention.

FIG. 2 is a flow-chart diagram of a sensor significance determination program, in accordance with at least one embodiment of the present invention. At step 200, the program identifies one or more sensor identifiers. At step 201, the program identifies one or more activity conclusions. At step 202, the program identifies one or more activity derivation rules, wherein each of the one or more activity derivation rules is associated with at least one of the one or more sensor identifiers and at least one of the one or more activity conclusions. At step 203, the program determines, for each of the one or more sensor identifiers, an overall predominance value based on at least one of the one or more activity derivation rules, wherein the overall predominance value is an estimation of the synergic significance of each of the one or more sensor identifiers to the one or more activity derivation rules.

FIG. 3 is an operational example of activity derivation rules, in accordance with at least one embodiment of the present invention. In the embodiment depicted in FIG. 3, each letter (i.e., A, B, C, D, and E) denotes a condition under which a particular sensor identifier has a particular value (e.g., the sensor identifier associated with the temperature of the room being above 0° C.), while each roman normal in brackets (i.e., [I], [II], and [III]) denotes an activity conclusion. According to the first activity derivation rule, activity conclusion [I] is determined when conditions A, C, and E are satisfied and/or when conditions B and D are satisfied. According to the second activity derivation rule, activity conclusion [II] is determined when conditions A, D, and E are satisfied and/or when conditions B and C are satisfied. According to the third activity derivation rule, activity conclusion [III] is determined when conditions A and D are satisfied and/or when conditions B, C and E are satisfied.

Returning to FIG. 3, let us assume condition A is associated with sensor s1, condition B is associated sensor s2, condition C is associated with sensor s3, condition D is associated with sensor s4, and condition E is satisfied with sensor s5. In that case, if the value associated with any single sensor is missing, all three activity conclusions can nevertheless be derived. For instance, activity conclusion [I] can be derived if s1, s2, s3, s4, or s5 are individually missing. Therefore, each sensor can have the same "individual significance." However, the individual significance cannot adequately explain the significance of sensors, because it fails to take into account the significance of sensors when in subsets of two or more sensors. For instance, if the subset of sensors {s1, s2} is not available, then no activity conclusion can be derived, while if the subset of sensors {s2, s3} is not available, then only one activity conclusion (i.e., activity conclusion [I]) cannot be derived. Therefore, sensors may have different levels of "synergic significance" even when their individual significance is the same. In at least some embodiments, the synergic significance of a sensor is the significance of the sensor to determining at least one activity conclusion, when such significance is determined based on both the individual significance of the sensor to determination of the at least one activity conclusion as well as the significance of at least one subset of two or more sensors comprising the sensor to the determination of the least one activity conclusion.

In some embodiments, determining, for each of the one or more sensor identifiers, the overall predominance value further comprises determining one or more sensor groupings (i.e., one or more subsets of sensor identifiers), wherein each of the one or more sensor groupings comprises at least one of the one or more sensor identifiers; determining one or more sensor listings (i.e., permutations of the one or more sensor identifiers), wherein each of the one or more sensor listings consists of a permutation of the one or more sensor identifiers; determining, for each of the one or more sensor groupings, an indispensability value (i.e., a value denoting the significance of each sensor grouping to the one or more activity derivation and/or how many of the one or more activity conclusions cannot be determined if each sensor identifier in the sensor grouping is not available); and determining, for each of the one or more sensor identifiers in the one or more sensor listings, an individual predominance value (defined below) based on at least one indispensability value. In at least some embodiments, the overall predominance value is determined based on a statistical measure (e.g., median, mean, and/or mode) of distribution of each the individual predominance value.

In an exemplary embodiment, an environment includes three sensors sA, sB, and sC. Based on those sensors, the sensor significance determination program can determine one or more of the following sensor listings: sA,sB,sC; sA,sC,sB; sB,sA,sC; sB,sC,sA; sC,sA,sB; and sC,sB,sA. For each sensor in each sensor listing, we can determine the individual predominance value based on the subtraction of the indispensability value associated with a primary exclusive sensor grouping (i.e., a sensor grouping comprising all the sensors in the permutation preceding the sensor subject to our analysis and excluding that analyzed sensor) from the subtraction of the indispensability value associated with a primary inclusive sensor grouping (i.e., a sensor grouping comprising all the sensors in the permutation preceding the sensor subject to our analysis and excluding that analyzed sensor). In the illustrated example, as to sensor listing sA,sB,sC, the individual predominance value of sensor sB is equal to the result of the subtraction of the indispensability value associated with {sA} (i.e., the primary exclusive sensor grouping) from the indispensability value associated {sA, sB} (i.e., the primary inclusive sensor grouping). In at least some embodiments, the individual predominance value associated with a sensor identifier in a sensor listing is a value determined based on the difference between a sensor grouping including the sensor identifier and a sensor grouping excluding the sensor identifier, wherein both sensor groupings are determined based on the ordering of the sensor identifiers in the sensor listing.

In some embodiments, the one or more sensor groupings consist of members of a power set of the one or more sensor identifiers (i.e., all possible sensor groupings formed based on the one or more sensor identifiers). In some embodiments, the one or more sensor listings are determined based on a randomized selection method (i.e., a method randomly selecting the one or more sensor listings from all the possible permutations of the one or more sensor identifiers) and a predefined sampling factor (i.e., the ratio of all the possible permutations of the one or more sensor identifiers selected as the one or more sensor listings). In some embodiments, each indispensability value is a measure of how many of the one or more activity conclusions cannot be properly derived if all members of each of the one or more sensor groupings associated with the indispensability value are unavailable. In some embodiments, the one or more sensor groupings comprise at least one primary inclusive sensor grouping and at least one primary exclusive sensor grouping, wherein each primary inclusive sensor grouping and each primary exclusive sensor grouping are associated with one of the one or more sensor identifiers; and each the individual probability value is a measure of the difference between the indispensability value associated with each primary inclusive sensor grouping and the indispensability value associated with each primary exclusive sensor grouping.

In some embodiments, the sensor significance determination program determines one or more predominant sensor identifiers (i.e., one or more sensor identifiers having the highest overall predominance values) based on is overall predominance value, wherein the one or more predominant sensor identifiers are a subset of the one or more sensor identifiers. In some embodiments, the number and/or ratio of the one or more predominant sensor identifiers is determined based on a predefined selection factor (i.e., a value indicating how many of the one or more sensor identifiers with the highest overall predominance value should be determined as the one or more predominant sensor identifiers; and/or a value indicating what ratio of the one or more sensor identifiers who have the highest overall predominance value should be determined as the one or more predominant sensor identifiers).

Embodiments of the present invention enable determining the significance of sensors to determining the state an environment and/or a device while considering the effect of synergy between the sensors. Nevertheless, the aforementioned advantages are not required to be present in all of the embodiments of the invention and may not be present in all of the embodiments of the invention.

In some embodiments, the parallel execution program operates as part of a software development platform, while in other embodiments the parallel execution program is part of a stand-alone software component that communicates with the software development platform and/or can be optionally added as an add-on program to the software development platform. In general, one or more steps associated with different embodiments of the parallel execution program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the parallel execution program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Figure 4:
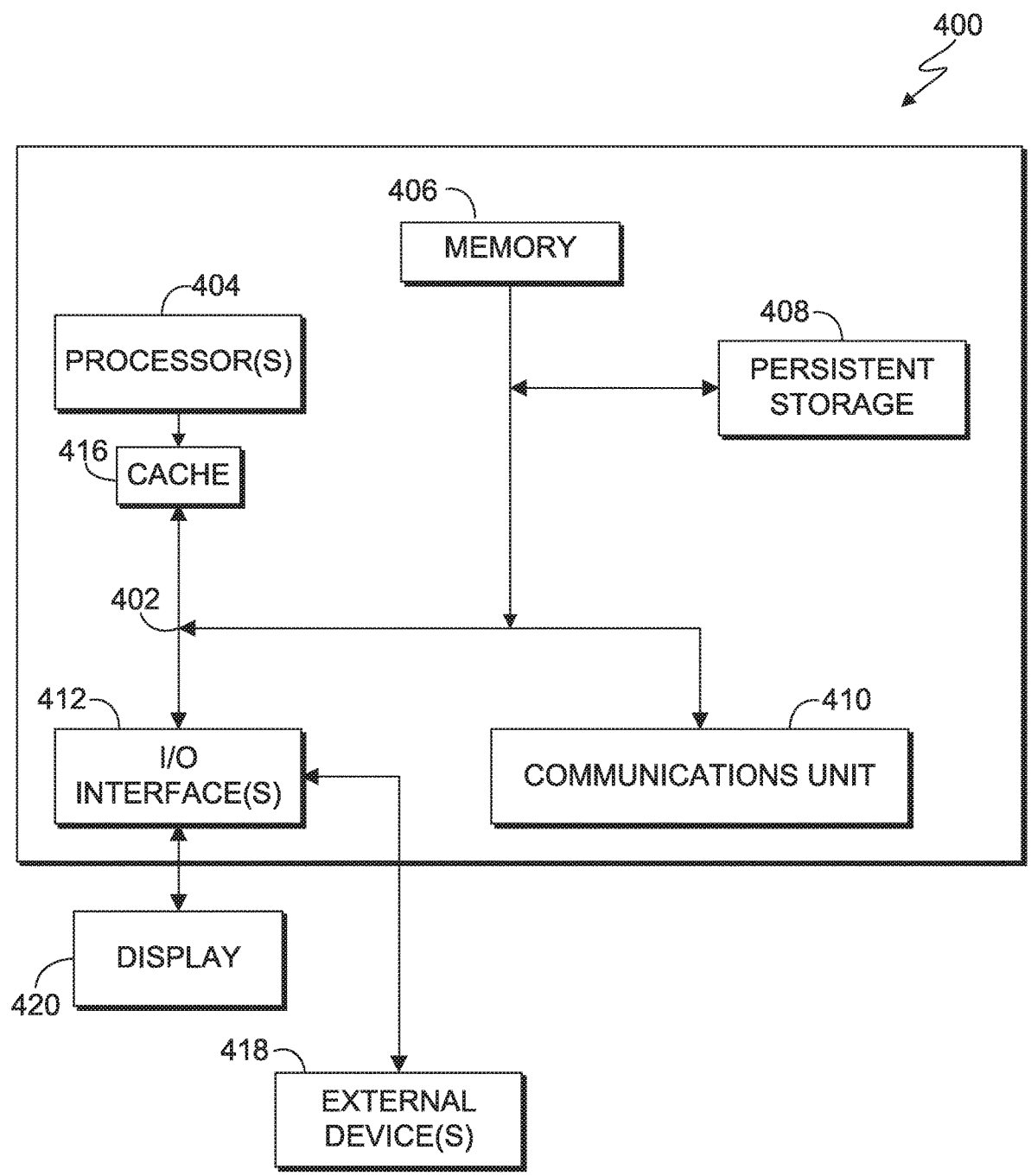
FIG. 4 is a block diagram of a computing apparatus suitable for executing a parallel execution program, in accordance with at least one embodiment of the present invention.

FIG. 4 is a block diagram depicting components of a computer 400 suitable for executing the parallel execution program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the parallel execution program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The parallel execution program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying one or more sensor identifiers;
   identifying one or more activity conclusions;
   identifying one or more activity derivation rules, each of said one or more activity derivation rules being associated with at least one of said one or more sensor identifiers and at least one of said one or more activity conclusions; and
   determining, for each of said one or more sensor identifiers, an overall predominance value based on at least one of said one or more activity derivation rules,
   wherein said predominance value is an estimation of the synergic significance of each of said one or more sensor identifiers to said one or more activity derivation rules,
   wherein each said overall predominance value is determined based on a statistical measure of distribution of each said individual predominance value.

2. The computer-implemented method of claim 1, further comprising:
   determining one or more predominant sensor identifiers based on each said overall predominance value, said one or more predominant sensor identifiers being a subset of said one or more sensor identifiers.

3. A computer program product, comprising one or more computer readable storage media and program instructions stored on said one or more computer readable storage media, said program instructions comprising instructions to:
   identify one or more sensor identifiers;
   identify one or more activity conclusions;
   identify one or more activity derivation rules, each of said one or more activity derivation rules being associated with at least one of said one or more sensor identifiers and at least one of said one or more activity conclusions; and determine, for each of said one or more sensor identifiers, an overall predominance value based on at least one of said one or more activity derivation rules, wherein said predominance value is an estimation of the synergic significance of each of said one or more sensor identifiers to said one or more activity derivation rules, wherein each said overall predominance value is determined based on a statistical measure of distribution of each said individual predominance value.

4. The computer program product of claim 3, wherein said program instructions further comprise instructions to:

determine one or more predominant sensor identifiers based on each said overall predominance value, said one or more predominant sensor identifiers being a subset of said one or more sensor identifiers.

5. A computer system comprising:
a processor;
one or more computer readable storage media;
computer program instructions;
said computer program instructions being stored on said one or more computer readable storage media; and
said computer program instructions comprising instructions to:
identify one or more sensor identifiers;
identifying one or more activity conclusions;
identify one or more activity derivation rules, each of said one or more activity derivation rules being associated with at least one of said one or more sensor identifiers and at least one of said one or more activity conclusions; and
determine, for each of said one or more sensor identifiers, an overall predominance value based on at least one of said one or more activity derivation rules,
wherein said predominance value is an estimation of the synergic significance of each of said one or more sensor identifiers to said one or more activity derivation rules,
wherein each said overall predominance value is determined based on a statistical measure of distribution of each said individual predominance value.

\* \* \* \* \*